(12) United States Patent
Kim

(10) Patent No.: US 10,618,549 B2
(45) Date of Patent: Apr. 14, 2020

(54) DAMPING CONTROL APPARATUS AND METHOD OF MOTOR DRIVEN POWER STEERING SYSTEM

(71) Applicant: Hyundai Mobis Co., Ltd., Seoul (KR)

(72) Inventor: Tae Hong Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 163 days.

(21) Appl. No.: 15/857,420

(22) Filed: Dec. 28, 2017

(65) Prior Publication Data

US 2018/0186401 A1 Jul. 5, 2018

(30) Foreign Application Priority Data

Jan. 2, 2017 (KR) ........................ 10-2017-0000473

(51) Int. Cl.
*B62D 5/04* (2006.01)
*B62D 6/08* (2006.01)
*B62D 6/00* (2006.01)

(52) U.S. Cl.
CPC ........... *B62D 5/0472* (2013.01); *B62D 6/008* (2013.01); *B62D 6/08* (2013.01)

(58) Field of Classification Search
CPC ......... B62D 5/0472; B62D 6/008; B62D 6/08
See application file for complete search history.

(56) References Cited

U.S. PATENT DOCUMENTS

| | | | | |
|---|---|---|---|---|
| 6,246,197 B1 * | 6/2001 | Kurishige | .............. | B62D 5/046 180/443 |
| 6,445,987 B1 * | 9/2002 | Kurishige | ............ | B62D 5/0466 180/410 |
| 6,450,287 B1 * | 9/2002 | Kurishige | ............ | B62D 5/0466 180/443 |
| 6,496,762 B2 * | 12/2002 | Kurishige | ............ | B62D 5/0466 180/446 |
| 6,768,283 B2 * | 7/2004 | Tanaka | ................. | B62D 5/0463 180/421 |
| 6,838,846 B2 * | 1/2005 | Matsuoka | ............ | B62D 5/0466 180/443 |

(Continued)

FOREIGN PATENT DOCUMENTS

KR 10-2016-0027663 3/2016

*Primary Examiner* — Tyler J Lee
(74) *Attorney, Agent, or Firm* — H.C. Park & Associates, PLC

(57) ABSTRACT

A damping control apparatus of a MDPS system including a column torque sensor configured to detect a column torque applied to a steering shaft and output a column torque signal; a steering angle sensor configured to detect a steering angular velocity of a steering wheel; a vehicle speed sensor configured to detect a travel speed of a vehicle; and a controller configured to receive the column torque signal, the travel speed and the steering angular velocity from the column torque sensor, the vehicle speed sensor and the steering angle sensor, calculate a required damping torque based on the steering angular velocity depending on the travel speed, calculate a damping torque compensation based on a boost torque, detect an oscillation depending on the travel speed from the column torque signal in order to calculate an additional damping gain, and compensate for the required damping torque using the additional damping gain.

11 Claims, 5 Drawing Sheets

(56) References Cited

U.S. PATENT DOCUMENTS

| | | | | |
|---|---|---|---|---|
| 6,854,559 B2* | 2/2005 | Kurishige | ............... | B62D 6/008 |
| | | | | 180/443 |
| 6,854,560 B2* | 2/2005 | Nishiyama | ............ | B62D 5/0463 |
| | | | | 180/446 |
| 6,863,150 B1* | 3/2005 | Tanaka | ................. | B62D 5/0463 |
| | | | | 180/443 |
| 7,036,626 B2* | 5/2006 | Niessen | ................. | B62D 6/007 |
| | | | | 180/443 |
| 7,275,617 B2* | 10/2007 | Endo | ...................... | B62D 6/008 |
| | | | | 180/402 |
| 7,628,247 B2* | 12/2009 | Hayashi | ............. | B62D 15/0285 |
| | | | | 180/443 |
| 8,074,763 B2* | 12/2011 | Hung | ....................... | B62D 5/09 |
| | | | | 180/417 |
| 8,306,702 B2* | 11/2012 | Suzuki | ................. | B62D 5/0466 |
| | | | | 180/400 |
| 9,809,246 B2* | 11/2017 | Tsubaki | ................. | B62D 5/0472 |
| 2002/0033300 A1* | 3/2002 | Takeuchi | ............. | B62D 5/0463 |
| | | | | 180/446 |
| 2003/0052639 A1* | 3/2003 | Tanaka | ................. | B62D 5/0463 |
| | | | | 318/632 |
| 2004/0061465 A1* | 4/2004 | Matsuoka | ............ | B62D 5/0466 |
| | | | | 318/432 |
| 2007/0233344 A1* | 10/2007 | Satake | ................. | B62D 5/0463 |
| | | | | 701/41 |
| 2016/0059884 A1 | 3/2016 | Gu | | |

* cited by examiner

DAMPING CONTROL APPARATUS AND METHOD OF MOTOR DRIVEN POWER STEERING SYSTEM

CROSS-REFERENCES TO RELATED APPLICATION

This application claims priority from and the benefit of Korean Patent Application No. 10-2017-0000473, filed on Jan. 2, 2017, which is hereby incorporated by reference for all purposes as if set forth herein.

BACKGROUND

Field

Exemplary embodiments relate to a damping control apparatus and method of a motor driven power steering (MDPS) system, and more particularly, to a damping control apparatus and method of a MDPS system, which can not only suppress yaw oscillations generated during steering, but also detect and suppress road surface vibration, thereby improving an on-center feel to stably providing a steering feel to a driver.

Discussion of the Background

In general, a MDPS system refers to a steering system that provides an assist torque in a steering direction by a driver, using an electric motor, and thus allows the driver to easily handle a steering wheel.

Unlike an existing hydraulic power steering (HPS) system, the MDPS system can automatically control the operation of the electric motor depending on a driving condition of a vehicle, thereby improving steering performance and steering feel.

At this time, the MDPS system includes a torque sensor, a steering angle sensor and a vehicle speed sensor, in order to determine the driving condition of the vehicle. The torque sensor measures a steering torque of the driver, inputted to the steering wheel, the steering angle sensor measures a steering angle of the steering wheel, and the vehicle speed sensor measures a vehicle speed.

When the MDPS system controls the motor to perform power steering, the MDPS system may compensate for friction to improve the steering feel and return performance. Thus, the driving performance of the vehicle may be enhanced.

Furthermore, a middle/high speed region may include a section in which a friction compensation torque and a damping control torque overlap each other. In this case, the MDPS system may improve the damping control performance by adjusting the friction compensation torque according to a damping torque, thereby securing the on-center steering feel, returnability, torque build-up and yaw stability of the vehicle.

The related art is disclosed in Korean Patent Publication No. 2016-0027663 published on Mar. 10, 2016 and entitled "Friction compensation control apparatus and method of MDPS system".

When providing a returning force and damping force to the steering wheel, the MDPS system calculates the damping force as a function of the vehicle speed, based on a column torque and vehicle speed.

Therefore, the MDPS may suppress yaw oscillations through the damping force, the yaw oscillations being caused during a steering operation.

The yaw oscillations are also caused by road surface vibration or resonance of a mechanical unit, but are not handled in a proper manner.

The above information disclosed in this Background section is only for enhancement of understanding of the background of the invention and, therefore, it may contain information that does not constitute prior art

SUMMARY

Exemplary embodiments of the present invention provide a damping control apparatus and method of a MDPS system, which can not only suppress yaw oscillations generated during steering, but also detect and suppress road surface vibration, thereby improving an on-center feel to stably providing a steering feel to a driver.

Additional features of the invention will be set forth in the description which follows, and in part will be apparent from the description, or may be learned by practice of the invention.

An exemplary embodiment of the present invention discloses a damping control apparatus of a motor driven power steering (MDPS) system including: a column torque sensor configured to detect a column torque applied to a steering shaft and output a column torque signal; a steering angle sensor configured to detect a steering angular velocity of a steering wheel; a vehicle speed sensor configured to detect a travel speed of a vehicle; and a controller configured to receive the column torque signal, the travel speed and the steering angular velocity from the column torque sensor, the vehicle speed sensor and the steering angle sensor, respectively, calculate a required damping torque based on the steering angular velocity depending on the travel speed, calculate a damping torque compensation based on a boost torque generated through the column torque signal, detect an oscillation depending on the travel speed from the column torque signal in order to calculate an additional damping gain, and compensate for the required damping torque using the additional damping gain.

The controller may include: a damping torque calculation unit configured to receive the travel speed and the steering angular velocity, and calculate the required damping torque based on the steering angular velocity depending on the travel speed; a damping torque compensation calculation unit configured to calculate the damping torque compensation based on the boost torque generated through a boost curve from the column torque signal; an oscillation detection unit configured to receive the column torque signal and the travel speed, and detect an oscillation of the steering wheel; a damping torque compensation unit configured to compensate for the required damping torque by applying the damping torque compensation calculated through the damping torque compensation calculation unit to the required damping torque calculated through the damping torque calculation unit, and additionally compensate for the required damping torque by applying the additional damping gain depending on the magnitude and frequency of the oscillation detected through the oscillation detection unit; and a damping torque output unit configured to limitedly output the required damping torque in order to prevent an excessive output of the required damping torque which was additionally compensated for by the damping torque compensation unit.

The damping torque calculation unit may calculate the required damping torque through a 2D map which is tuned according to a vehicle characteristic and a driver's inclination, based on the travel speed and the steering angular velocity.

The damping torque compensation calculation unit may calculate the damping torque compensation based on the magnitude of the boost torque.

The damping torque compensation calculation unit may calculate the damping torque compensation based on a variation of the boost torque.

The oscillation detection unit may detect the frequency and magnitude of the oscillation using DFT (Discrete Fourier Transform).

An exemplary embodiment of the present invention also discloses a damping control method of a MDPS system including: receiving, by a controller, a column torque signal, a steering angular velocity and a travel speed from a column torque sensor, a steering angle sensor and a vehicle speed sensor, respectively; calculating, by the controller, a required damping torque based on the steering angular velocity depending on the travel speed; calculating, by the controller, a damping torque compensation based on a boost torque generated through a boost curve from the column torque signal; detecting, by the controller, an oscillation of a steering wheel from the travel speed and the column torque signal; compensating for, by the controller, the required damping torque by applying the damping torque compensation to the required damping torque, and additionally compensating for the required damping torque by applying an additional damping gain depending on the magnitude and frequency of the oscillation; and limitedly outputting, by the controller, the required damping torque in order to prevent an excessive output of the required damping torque which was additionally compensated for.

In the calculating of the required damping torque, the controller may calculate the required damping torque through a 2D map which is tuned according to a vehicle characteristic and a driver's inclination, based on the travel speed and the steering angular velocity.

In the calculating of the damping torque compensation, the controller may calculate the damping torque compensation based on the magnitude of the boost torque.

In the calculating of the damping torque compensation, the controller may calculate the damping torque compensation based on a variation of the boost torque.

In the detecting of the oscillation of the steering wheel, the controller may detect the frequency and magnitude of the oscillation using DFT.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
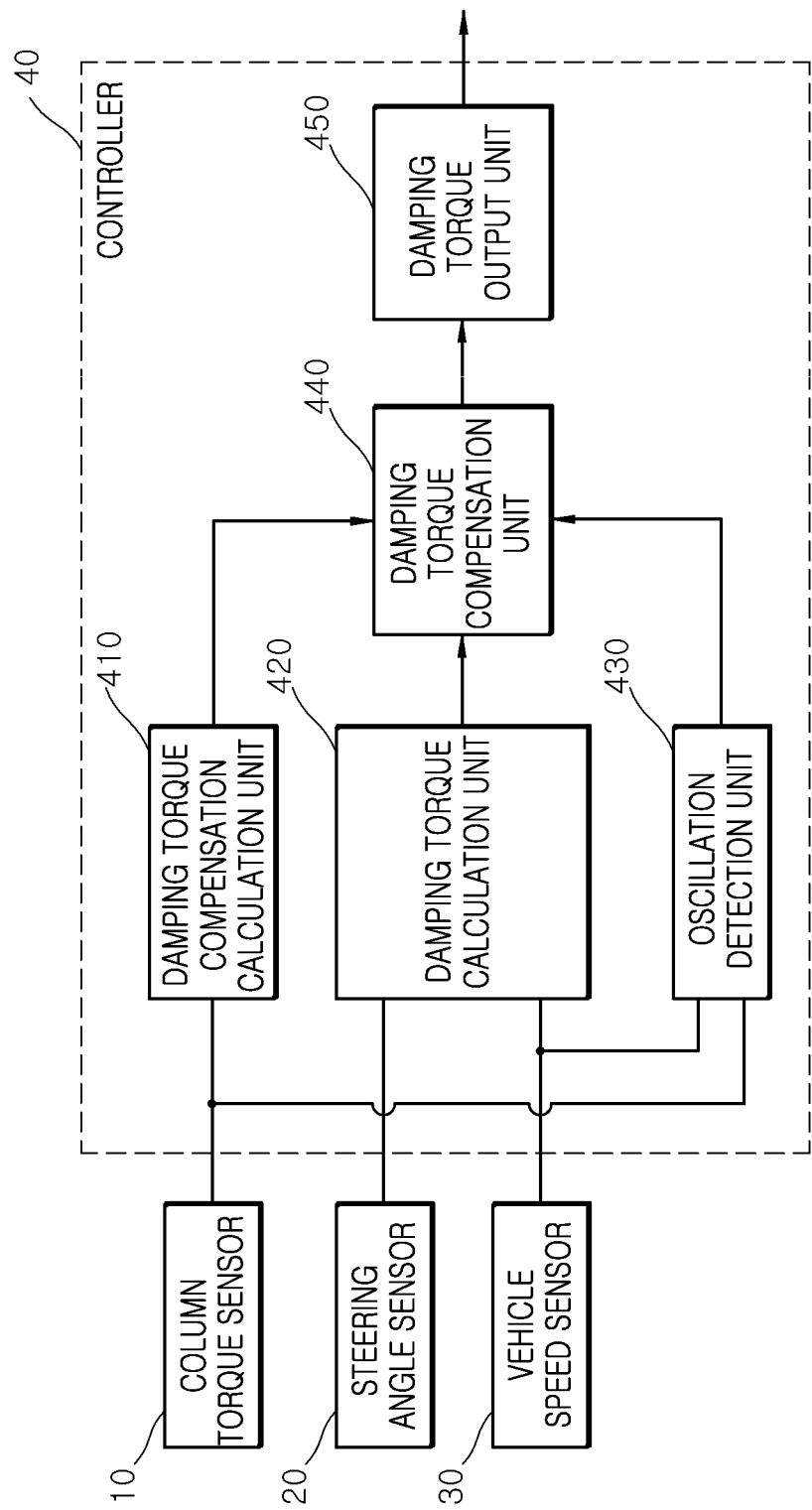
FIG. 1 is a block diagram illustrating a damping control apparatus of a MDPS system in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 2:
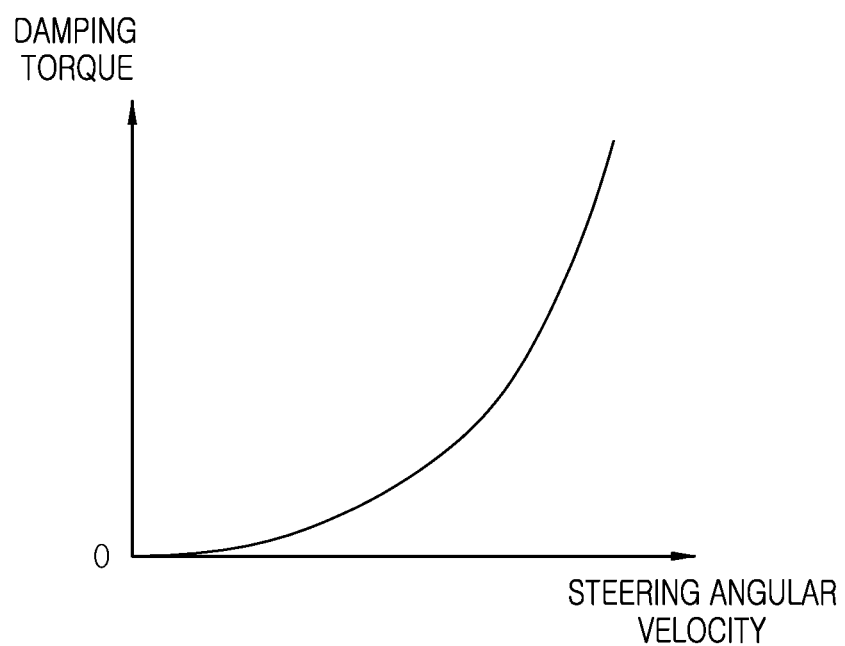
FIG. 2 is a graph illustrating the relationship between steering angular velocity and damping torque in the damping control apparatus of the MDPS system in accordance with the embodiment of the present invention.
Figure 3A:
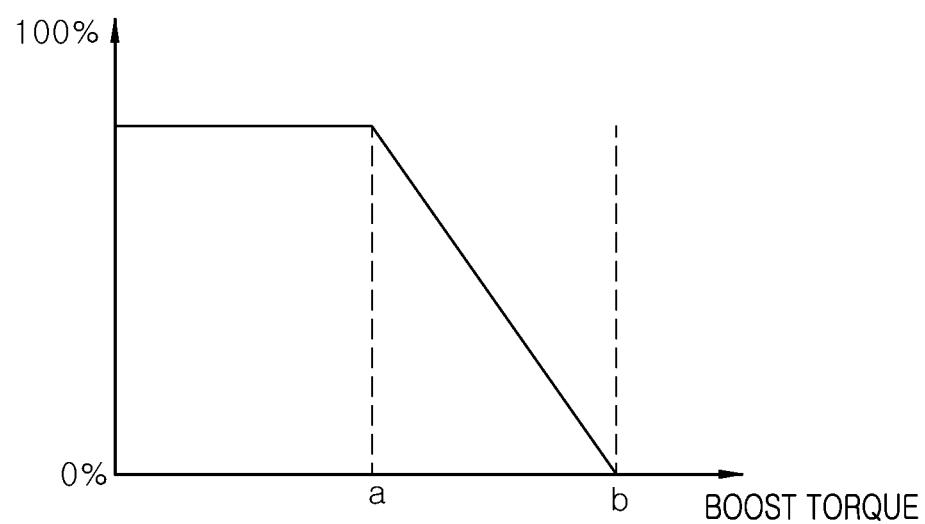
FIG. 3A and FIG. 3B are graphs illustrating a damping compensation depending on a boost torque in the damping control apparatus of the MDPS system in accordance with the embodiment of the present invention.
Figure 3B:
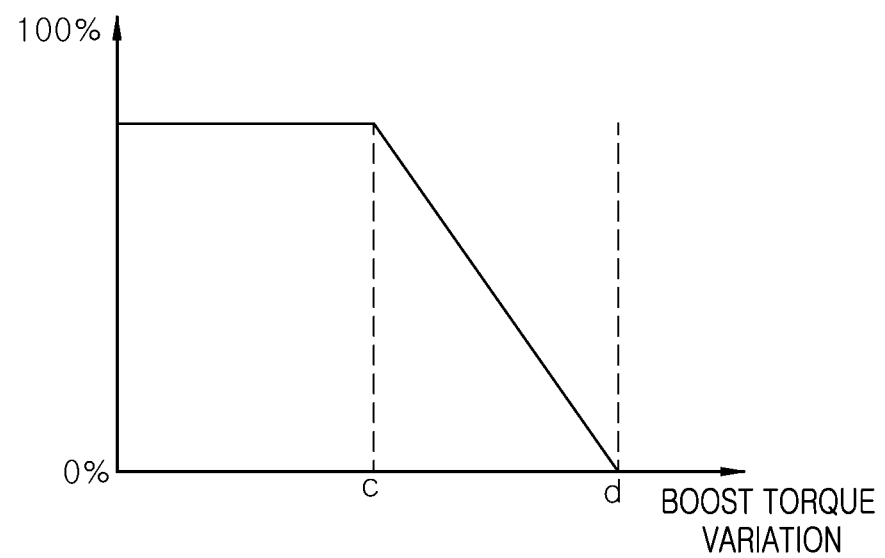
Figure 4:
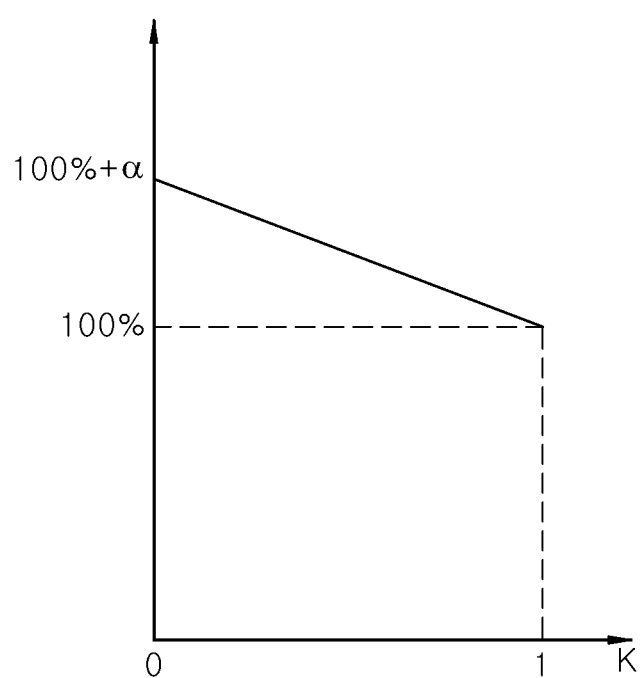
FIG. 4 is a graph illustrating an additional damping gain in the damping control apparatus of the MDPS system in accordance with the embodiment of the present invention.
Figure 5:
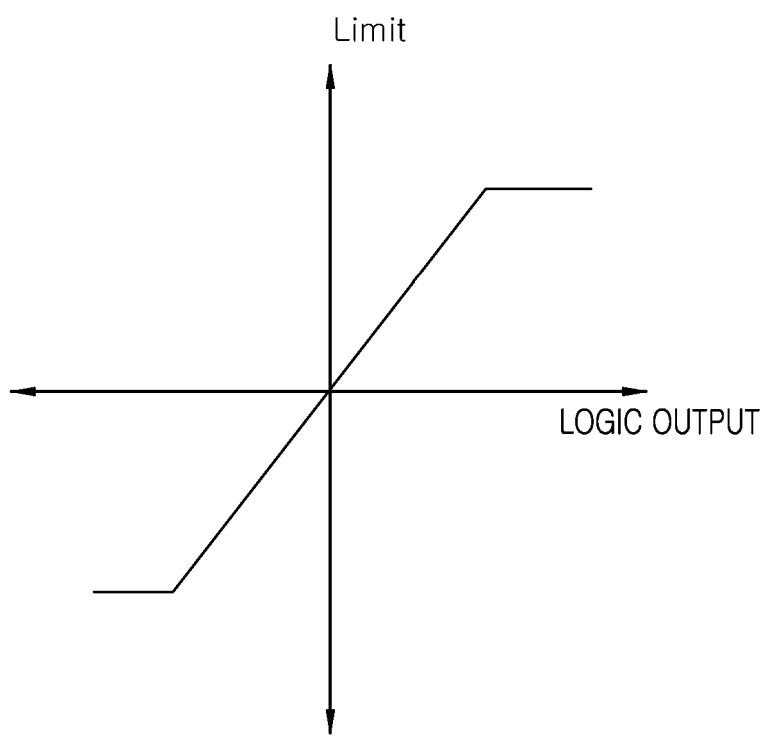
FIG. 5 is a graph illustrating the limit relation of a damping torque in the damping control apparatus of the MDPS system in accordance with the embodiment of the present invention.

FIG. 1 is a block diagram illustrating a damping control apparatus of a MDPS system in accordance with an embodiment of the present invention, FIG. 2 is a graph illustrating the relationship between steering angular velocity and damping torque in the damping control apparatus of the MDPS system in accordance with the embodiment of the present invention, FIGS. 3A and 3B are graphs illustrating a damping compensation depending on a boost torque in the damping control apparatus of the MDPS system in accordance with the embodiment of the present invention, FIG. 4 is a graph illustrating an additional damping gain in the damping control apparatus of the MDPS system in accordance with the embodiment of the present invention, and FIG. 5 is a graph illustrating the limit relation of a damping torque in the damping control apparatus of the MDPS system in accordance with the embodiment of the present invention.

As illustrated in FIG. 1, the damping control apparatus of the MDPS system in accordance with the embodiment of the present invention may include a column torque sensor 10, a steering angle sensor 20, a vehicle speed sensor 30 and a controller 40.

The column torque sensor 10 may detect a column torque applied to a steering shaft (not illustrated) when a driver handles a steering wheel (not illustrated), and output a column torque signal to the controller 40.

At this time, the column torque signal may include oscillations felt through the steering wheel as well as the column torque applied to the steering shaft.

Therefore, based on the column torque signal, the controller 40 may detect the oscillations and calculate an additional damping gain.

The steering angle sensor 20 may detect a steering angular velocity of the steering wheel, and provides the steering angular velocity to the controller 40.

The steering angle sensor 20 may include an optical sensor for detecting a steering angular velocity, or detect a steering angular velocity by measuring a steering angle and differentiating the steering angle with time.

The vehicle speed sensor 30 may detect the travel speed of the vehicle, and provide the detected travel speed to the controller 40.

The vehicle speed sensor 30 may include various sensors such as a sensor for detecting the speed of the traveling vehicle using the rotational velocity of a wheel and a sensor for detecting a vehicle speed using GPS (Global Positioning System).

The controller 40 may receive the column torque signal, the travel speed and the steering angular velocity from the column torque sensor 10, the vehicle speed sensor 30 and the steering angle sensor 20, and calculate a required damping torque based on the steering angular velocity depending on the travel speed.

The controller 40 may calculate a damping torque compensation based on a boost torque generated through the column torque signal, detect oscillations depending on the travel speed and the steering angular velocity in order to calculate an additional damping gain, and compensate for the required damping torque using the additional damping gain.

For this operation, the controller 40 may include a damping torque calculation unit 420, a damping torque compensation calculation unit 410, an oscillation detection unit 430, a damping torque compensation unit 440 and a damping torque output unit 450.

The damping torque calculation unit 420 may receive the travel speed and the steering angular velocity, and calculate the required damping torque based on the steering angular velocity depending on the travel speed.

As illustrated in FIG. 2, the damping torque calculation unit 420 may calculate the required damping torque based on the travel speed and the steering angle velocity, through a two-dimensional (2D) map which is tuned according to the vehicle characteristic and a driver's inclination.

The damping torque compensation calculation unit 410 may calculate a damping torque compensation based on a boost torque generated from the column torque signal through a boost curve.

At this time, the damping torque compensation calculation unit 410 may calculate a damping torque compensation depending on the magnitude of the boost torque as illustrated in FIG. 3A, or calculate a damping torque compensation depending on a variation of the boost torque as illustrated in FIG. 3B.

The oscillation detection unit 430 may receive the travel speed and the column torque signal, and detect the frequency and magnitude of oscillation sensed from the steering wheel.

The oscillation detection unit 430 may detect the frequency and magnitude of oscillation using DFT (Discrete Fourier Transform).

At this time, various algorithms such as the Goertzel algorithm may be used in order to improve the load factor or calculation speed of the oscillation detection unit 430.

The damping torque compensation unit 440 may compensate for the required damping torque by applying the damping torque compensation calculated through the damping torque compensation calculation unit 410 to the required damping torque calculated through the damping torque calculation unit 420, and additionally compensate for the required damping torque by applying an additional damping gain depending on the magnitude and frequency of the oscillation detected through the oscillation detection unit 430.

As illustrated in FIG. 4, the damping torque compensation unit 440 may set the additional damping gain optimized through a vehicle test to 100%+α in consideration of the magnitude of the oscillation detected through the oscillation detection unit 430.

At this time, when the oscillation was generated in a specific frequency band, a damping gain may be additionally applied.

Specifically, the damping torque compensation unit 440 may derive a filtering gain K according to the characteristics of a lead-lag compensator, based on the frequency and magnitude of the oscillation detected through the oscillation detection unit 430.

At this time, when the filtering gain K is smaller, oscillations can be more deeply and widely removed while the damping effect is raised. On the other hand, when the filtering gain k is larger, the characteristic of a band stop filter may disappear. Therefore, the damping torque compensation unit 440 may process the filtering gain K as a damping gain. When the oscillation frequency is high or the filtering gain K is small, the damping torque compensation unit 440 may apply a large damping gain to raise the damping torque.

As such, the damping torque compensation unit 440 may derive the filtering gain K for suppressing oscillation according to the frequency and magnitude of the oscillation, decide an additional damping gain based on the filtering gain K, and compensate for the damping torque using the additional damping gain, thereby acquiring the damping torque optimized for the oscillation of the steering wheel.

The damping torque output unit 450 may limit an output of the required damping torque when the required damping torque exceeds a limit value which is set to prevent an excessive output of the required damping torque which was additionally compensated for by the damping torque compensation unit 440.

The damping torque output unit 450 may set the limit value as illustrated in FIG. 5, and limit an output of the required damping torque.

As described above, the damping control apparatus of the MDPS system in accordance with the present embodiment can not only suppress yaw oscillations generated during steering, but also detect and suppress road surface vibration, thereby improving the on-center feel. Thus, the damping control apparatus can stably provide a comfortable steering feel to a driver.

Figure 6:
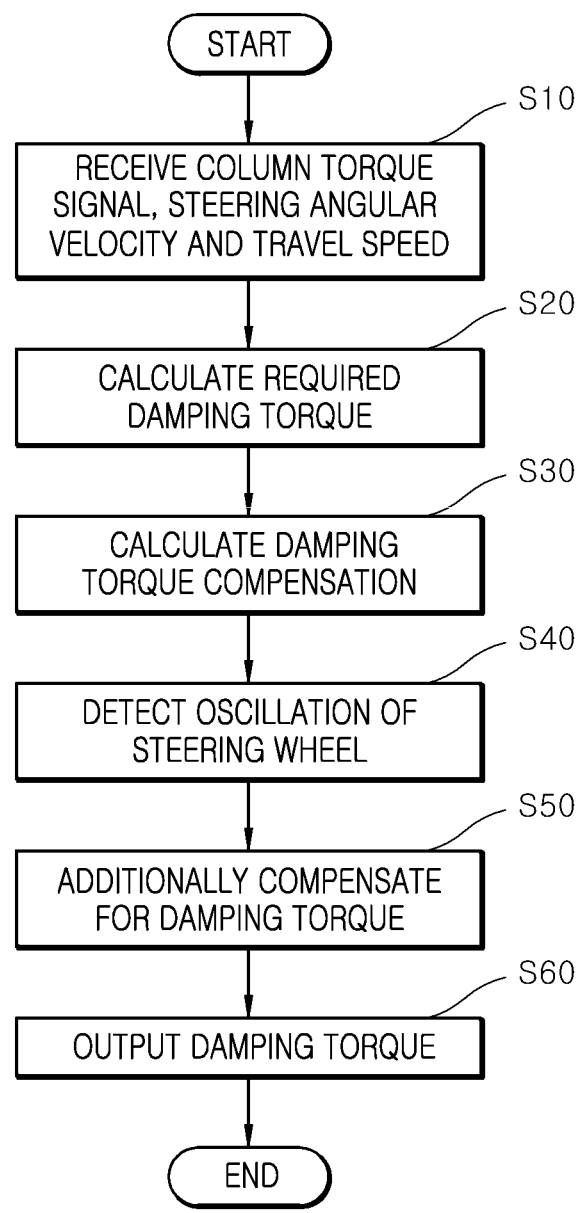
FIG. 6 is a flowchart illustrating a damping control method of a MDPS system in accordance with an embodiment of the present invention.

FIG. 6 is a flowchart illustrating a damping control method of a MDPS system in accordance with an embodiment of the present invention.

As illustrated in FIG. 6, the damping control method of the MDPS system in accordance with the embodiment of the present invention may begin with step S10 in which the controller 40 receives a column torque signal, a steering angular velocity and a travel speed from the column torque sensor 10, the steering angle sensor 20 and the vehicle speed sensor 30.

Then, the controller 40 may calculate a required damping torque based on the steering angular velocity depending on the travel speed, at step S20.

At this time, as illustrated in FIG. 2, the controller 40 may calculate the required damping torque based on the travel speed and the steering angle velocity, through a 2D map which is tuned according to vehicle characteristics and a driver's inclination.

Furthermore, the controller 40 may calculate a damping torque compensation based on a boost torque generated from the column torque signal through the boost curve.

At this time, the controller 40 may calculate a damping torque compensation depending on the magnitude of the boost torque as illustrated in FIG. 3A, or calculate a damping torque compensation depending on a variation of the boost torque as illustrated in FIG. 3B.

The controller 40 may detect oscillation of the steering wheel from the travel speed and the column torque signal at step S40.

The controller 40 may detect the frequency and magnitude of the oscillation using DFT.

At this time, various algorithms such as the Goertzel algorithm may be used in order to improve the load factor or calculation speed of the controller 40.

After detecting the damping torque, the damping torque compensation and the oscillation of the steering wheel, the controller 40 may compensate for the required damping torque by applying the damping torque compensation to the required damping torque, and additionally compensate for the required damping torque by applying an additional damping gain depending on the magnitude and frequency of the oscillation, at step S50.

That is, as illustrated in FIG. 4, the controller 40 may set the additional damping gain optimized through a vehicle test to 100%+α, in consideration of the magnitude of the oscillation of the steering wheel. At this time, the controller 40 may additionally apply a damping gain when the oscillation was generated in a specific frequency band.

Specifically, the controller 40 may derive a filtering gain K according to the characteristic of a lead-lag compensator, based on the frequency and magnitude of the oscillation.

At this time, when the filtering gain K is smaller, oscillations can be more deeply and widely removed while the damping effect is raised. On the other hand, when the filtering gain k is larger, the characteristic of a band stop filter may disappear. Therefore, the controller 40 may process the filtering gain K as a damping gain. When the oscillation frequency is high or the filtering gain K is small, the controller 40 may apply a large damping gain to raise the damping torque.

As such, the controller 40 may derive the filtering gain K for suppressing oscillation according to the frequency and magnitude of the oscillation, decide an additional damping gain based on the filtering gain K, and compensate for the damping torque using the additional damping gain, thereby acquiring the damping torque optimized for the oscillation of the steering wheel.

Then, the controller 40 may limit an output of the required damping torque when the required damping torque exceeds a limit value which is set to prevent an excessive output of the required damping torque which was additionally compensated for.

That is, as illustrated in FIG. 5, the controller 40 may set the limit value, and limit an output of the required damping torque when the required damping torque exceeds the limit value.

As described above, the damping control method of the MDPS system in accordance with the present embodiment can not only suppress yaw oscillations generated during steering, but also detect and suppress road surface vibration, thereby improving the on-center feel. Thus, the damping control method can stably provide a comfortable steering feel to a driver.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure

What is claimed is:

1. A damping control apparatus of a motor driven power steering (MDPS) system, comprising:
    a column torque sensor configured to detect a column torque applied to a steering shaft and output a column torque signal;
    a steering angle sensor configured to detect a steering angular velocity of a steering wheel;
    a vehicle speed sensor configured to detect a travel speed of a vehicle; and
    a controller configured to receive the column torque signal, the travel speed, and the steering angular velocity from the column torque sensor, the vehicle speed sensor and the steering angle sensor; calculate a required damping torque based on the steering angular velocity depending on the travel speed; calculate a damping torque compensation based on a boost torque generated through the column torque signal; detect an oscillation depending on the travel speed from the column torque signal in order to calculate an additional damping gain; and compensate for the required damping torque using the additional damping gain.

2. The damping control apparatus of claim 1, wherein the controller comprises:
a damping torque calculation unit configured to receive the travel speed and the steering angular velocity, and calculate the required damping torque based on the steering angular velocity depending on the travel speed;
a damping torque compensation calculation unit configured to calculate the damping torque compensation based on the boost torque generated through a boost curve from the column torque signal;
an oscillation detection unit configured to receive the column torque signal and the travel speed, and detect an oscillation of the steering wheel;
a damping torque compensation unit configured to compensate for the required damping torque by applying the damping torque compensation calculated through the damping torque compensation calculation unit to the required damping torque calculated through the damping torque calculation unit, and additionally compensate for the required damping torque by applying the additional damping gain depending on the magnitude and frequency of the oscillation detected through the oscillation detection unit; and
a damping torque output unit configured to limitedly output the required damping torque in order to prevent an excessive output of the required damping torque which was additionally compensated for by the damping torque compensation unit.

3. The damping control apparatus of claim 2, wherein the damping torque calculation unit is configured to calculate the required damping torque through a 2D map which is tuned according to a vehicle characteristic and a driver's inclination, based on the travel speed and the steering angular velocity.

4. The damping control apparatus of claim 2, wherein the damping torque compensation calculation unit is configured to calculate the damping torque compensation based on the magnitude of the boost torque.

5. The damping control apparatus of claim 2, wherein the damping torque compensation calculation unit is configured to calculate the damping torque compensation based on a variation of the boost torque.

6. The damping control apparatus of claim 2, wherein the oscillation detection unit is configured to detect the frequency and magnitude of the oscillation using DFT (Discrete Fourier Transform).

7. A damping control method of a MDPS system, comprising:
receiving, by a controller, a column torque signal, a steering angular velocity and a travel speed from a column torque sensor, a steering angle sensor, and a vehicle speed sensor, respectively;
calculating, by the controller, a required damping torque based on the steering angular velocity depending on the travel speed;
calculating, by the controller, a damping torque compensation based on a boost torque generated through a boost curve from the column torque signal;
detecting, by the controller, an oscillation of a steering wheel from the travel speed and the column torque signal;
compensating for, by the controller, the required damping torque by applying the damping torque compensation to the required damping torque, and additionally compensating for the required damping torque by applying an additional damping gain depending on the magnitude and frequency of the oscillation; and
limitedly outputting, by the controller, the required damping torque in order to prevent an excessive output of the required damping torque which was additionally compensated for.

8. The damping control method of claim 7, wherein in the calculating of the required damping torque, the controller calculates the required damping torque through a 2D map which is tuned according to a vehicle characteristic and a driver's inclination, based on the travel speed and the steering angular velocity.

9. The damping control method of claim 7, wherein in the calculating of the damping torque compensation, the controller calculates the damping torque compensation based on the magnitude of the boost torque.

10. The damping control method of claim 7, wherein in the calculating of the damping torque compensation, the controller calculates the damping torque compensation based on a variation of the boost torque.

11. The damping control method of claim 7, wherein in the detecting of the oscillation of the steering wheel, the controller detects the frequency and magnitude of the oscillation using DFT.

* * * * *